US012563048B2

(12) United States Patent
Achleitner

(10) Patent No.: US 12,563,048 B2
(45) Date of Patent: Feb. 24, 2026

(54) AUTOMATED CLUSTERING OF SESSIONS OF UNSTRUCTURED TRAFFIC

(71) Applicant: Palo Alto Networks, Inc., Santa Clara, CA (US)

(72) Inventor: Stefan Achleitner, Arlington, VA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 1080 days.

(21) Appl. No.: 17/321,796

(22) Filed: May 17, 2021

(65) Prior Publication Data

US 2022/0368701 A1     Nov. 17, 2022

(51) Int. Cl.
| | |
|---|---|
| *H04L 9/40* | (2022.01) |
| *G06F 18/22* | (2023.01) |
| *G06F 18/23* | (2023.01) |
| *G06F 18/232* | (2023.01) |
| *G06F 18/2321* | (2023.01) |
| *G06N 20/00* | (2019.01) |
| *H04L 67/14* | (2022.01) |

(52) U.S. Cl.
CPC .......... *H04L 63/1416* (2013.01); *G06F 18/22* (2023.01); *G06F 18/23* (2023.01); *G06F 18/232* (2023.01); *G06F 18/2321* (2023.01); *G06N 20/00* (2019.01); *H04L 63/1425* (2013.01); *H04L 63/16* (2013.01); *H04L 67/14* (2013.01)

(58) Field of Classification Search
CPC .................................................. H04L 63/1416
USPC ........................ 706/12; 382/228; 340/539.12
See application file for complete search history.

(56) References Cited

U.S. PATENT DOCUMENTS

| | | | | |
|---|---|---|---|---|
| 9,788,210 B2 * | 10/2017 | Arad | ....................... | H04L 47/10 |
| 10,388,272 B1 * | 8/2019 | Thomson | ................ | G10L 15/22 |
| 10,482,382 B2 * | 11/2019 | Seaton | ................... | G06N 5/022 |
| 2015/0063713 A1 * | 3/2015 | Yang | .................... | G06V 30/245 |
| | | | | 382/228 |
| 2017/0104630 A1 * | 4/2017 | Shelton | ................ | H04L 61/103 |

(Continued)

FOREIGN PATENT DOCUMENTS

| | | | | | |
|---|---|---|---|---|---|
| EP | 3286650 B1 * | 6/2022 | .......... | G06F 21/566 |

OTHER PUBLICATIONS

Liu, et al., "Effective and Real-time In-App Activity Analysis in Encrypted Internet Traffic Streams", KDD '17: Proceedings of the 23rd ACM SIGKDD International Conference on Knowledge Discovery and Data Mining, Aug. 2017, 10 pages.

(Continued)

*Primary Examiner* — Ruay Ho
(74) *Attorney, Agent, or Firm* — Gilliam IP PLLC

(57)     ABSTRACT

A natural language processor extracts features from batches of unstructured traffic. A feature weighted distance engine computes a distance matrix between pairs of feature vectors for sessions of unstructured traffic using a weight vector that assigns importance to relative placement of features in feature vectors. The distance function used to compute the distance matrix with the weight vector is conducive to generating high-quality clusters and patterns in unstructured traffic. The sessions of unstructured traffic are clustered according to the pairwise distance matrix. Generated clusters are merged with clusters for previously analyzed sessions of unstructured traffic. A pattern identification engine extracts patterns from the merged clusters that correspond to behavior of applications generating the unstructured traffic.

20 Claims, 7 Drawing Sheets

(56) References Cited

U.S. PATENT DOCUMENTS

| | | | | |
|---|---|---|---|---|
| 2019/0188212 A1* | 6/2019 | Miller | .................. | H04L 63/145 |
| 2020/0112571 A1* | 4/2020 | Koral | ...................... | G06N 3/08 |
| 2021/0133881 A1* | 5/2021 | Egger | ................. | G06V 10/762 |
| 2023/0081472 A1* | 3/2023 | Wang | .................. | H04W 4/029 |
| | | | | 340/539.12 |

OTHER PUBLICATIONS

Qadar, et al., "Comparative Analysis of Clustering Techniques in Network Traffic Faults Classification", International Journal of Innovative Research in Computer and Communication Engineering, vol. 5, Iss. 4, Apr. 2017, 13 pages.
Vlăduţu, et al., "Internet Traffic Classification Based on Flows Statistical Properties with Machine Learning", International Journal of Network Management, 2015, 14 pages.

* cited by examiner

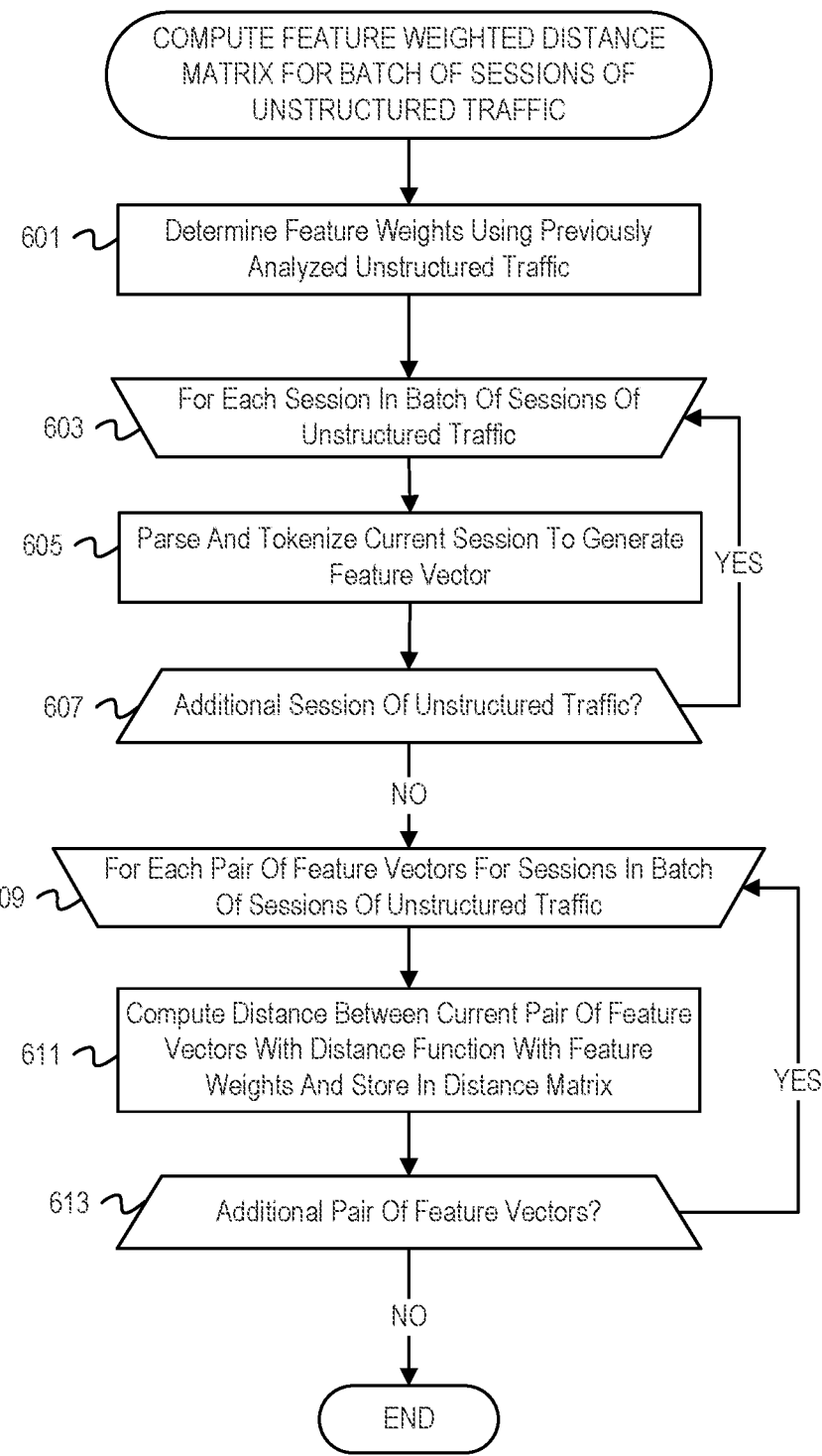

COMPUTE FEATURE WEIGHTED DISTANCE MATRIX FOR BATCH OF SESSIONS OF UNSTRUCTURED TRAFFIC

601 — Determine Feature Weights Using Previously Analyzed Unstructured Traffic

603 — For Each Session In Batch Of Sessions Of Unstructured Traffic

605 — Parse And Tokenize Current Session To Generate Feature Vector

607 — Additional Session Of Unstructured Traffic?          YES

NO

609 — For Each Pair Of Feature Vectors For Sessions In Batch Of Sessions Of Unstructured Traffic 611 — Compute Distance Between Current Pair Of Feature Vectors With Distance Function With Feature Weights And Store In Distance Matrix 613 — Additional Pair Of Feature Vectors?          YES

NO

END

FIG. 6

AUTOMATED CLUSTERING OF SESSIONS OF UNSTRUCTURED TRAFFIC

BACKGROUND

The disclosure generally relates to information security and packet filtering.

Transmission Control Protocol (TCP) is a transport layer protocol that enables communication between applications. Examples of application layer protocols using TCP as a transport layer protocol include Hypertext Transfer Protocol, Secure Shell Protocol, File Transfer Protocol, and Simple Mail Transfer Protocol. Packets in TCP traffic include fields such as source and destination identifiers, data offsets, checksums, windows, options, data etc. all within a 32-bit architecture.

BRIEF DESCRIPTION OF THE DRAWINGS

Embodiments of the disclosure may be better understood by referencing the accompanying drawings.

FIG. 6 is a flowchart of example operations for computing a feature weighted distance matrix for a batch of sessions of unstructured traffic.

DESCRIPTION

Figure 1:
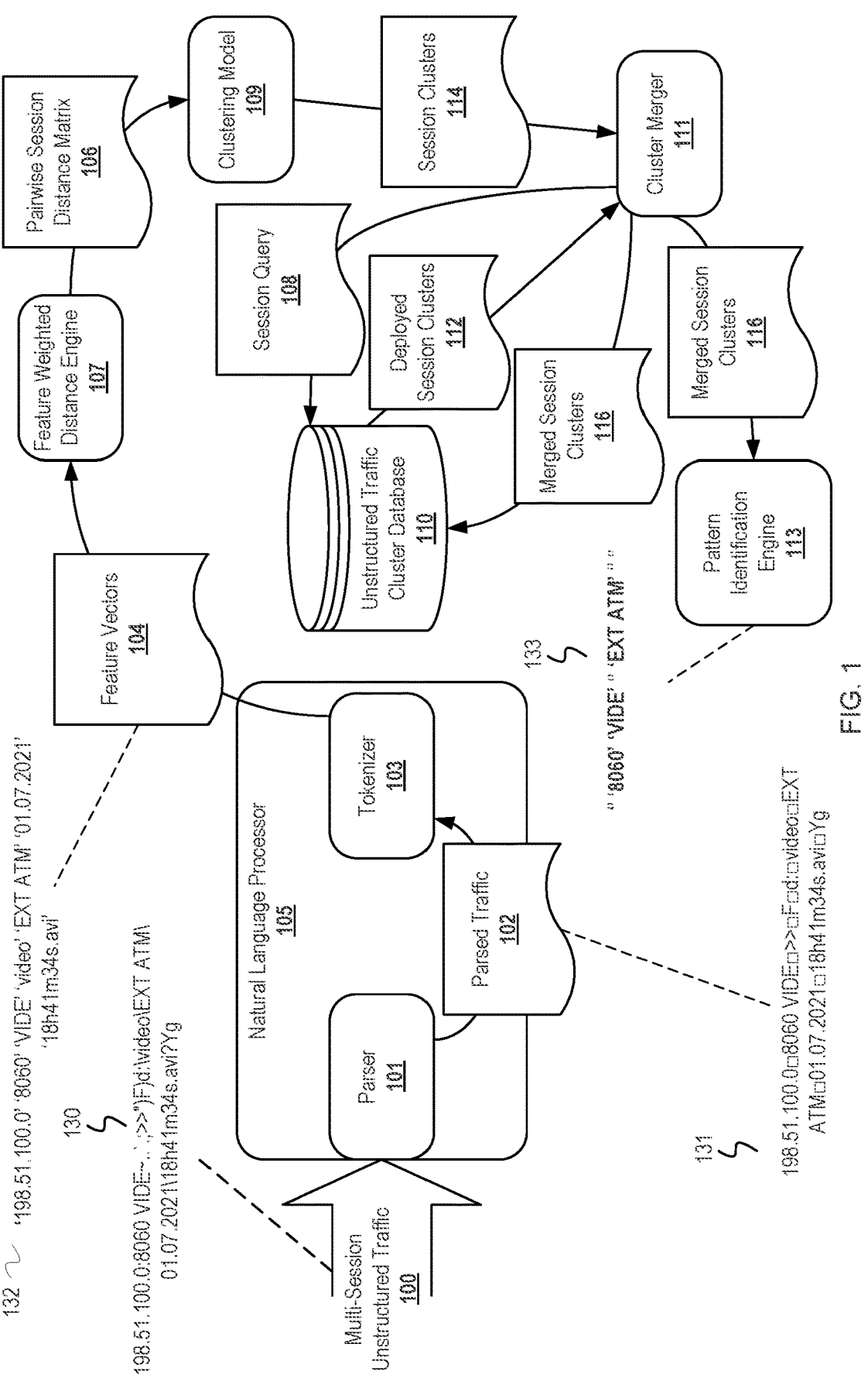
FIG. 1 is a schematic diagram of an example system for generating session clusters for unstructured traffic via feature weighted session distances.

The description that follows includes example systems, methods, techniques, and program flows that embody aspects of the disclosure. However, it is understood that this disclosure may be practiced without these specific details. For instance, this disclosure refers to clustering of unstructured TCP traffic in illustrative examples. Embodiments of this disclosure can be applied to clustering traffic conforming to any communications protocol that would be considered unstructured traffic, such as user datagram protocol (UDP) traffic. In other instances, well-known instruction instances, protocols, structures and techniques have not been shown in detail in order not to obfuscate the description.

Terminology

The term "data flow layer" refers to a network stack layer that is below the application layer, such as the transport layer or network layer. A data flow layer may be below other layers (e.g., presentation layer and session layer) depending upon the network stack implementation. Examples of communication protocols corresponding to a data flow layer include TCP and UDP.

"Unstructured traffic" refers to network traffic (i.e., data communicated over a communication network(s)) communicated as protocol data units (PDUs) at a data flow layer with payloads that do not have a structure/format conforming to an application layer protocol (e.g., Hypertext Transfer Protocol (HTTP)) that can be discerned at the data flow layer. Although an application layer protocol that can be discerned with a data flow layer payload is likely a standardized application protocol, such as HTTP, this can also be an application layer protocol that is not standardized but is known/trusted by a host that receives the network traffic. Thus, characterization of network traffic as unstructured can depend upon the host. Unstructured traffic can contain noise (e.g., erroneous or incorrect characters) and can originate from malicious sources. The PDUs in unstructured traffic are also referred to herein as "unstructured packets" or "unstructured PDUs."

"Session" refers to a communication exchange between two endpoints in the form of network traffic that likely includes exchange of request and response PDUs between the endpoints. Sessions are opened and closed according to a communication protocol. Session protocols can include a handshake used to validate endpoints communicating network traffic during the session prior to commencing the session. In some models of network layers (e.g., the Internet Protocol suite), the session layer is combined with the presentation layer and application layer into a single application layer operating above a transport (i.e., data flow) layer.

The use of "feature vector" herein refers alternatively to a list of numbers and strings of American Standard Code for Information Interchange (ASCII) characters corresponding to substantive features of a session of unstructured traffic. Whether explicitly stated or not, numerical and/or ASCII feature vectors can be computed and stored by various components of the systems depicted herein and can be communicated between components during any of the related distance computation, clustering, and merging operations. In some instances, feature vectors will have variable length due to variable length of sessions of unstructured traffic. During computations between feature vectors of variable length, feature vectors with smaller length can be padded with zeros or empty ASCII strings to match the length of the longest feature vector within a cluster, a set of clusters, batches of sessions of unstructured traffic, etc. "Features" refer to the entries of a feature vector.

"Placement" refers to the relative position of features in feature vectors for unstructured traffic. More specifically, this refers to an index or identifier of a specific feature position across feature vectors (e.g., 1st entry of feature vectors). "Relative placement" refers to the relative ordering of indices or identifiers between features in a feature vector or across feature vectors.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

A device or application that monitors network traffic (e.g., a cybersecurity appliance) may secure a network and/or devices by enforcing a policy(ies) that identifies allowed and/or disallowed applications. To enforce the policy, the cybersecurity appliance can attempt to match a pattern/signature of session traffic against application traffic signatures specified for policy enforcement (e.g., application traffic signatures of allowed and/or disallowed applications). However, discerning a signature/pattern for unstructured traffic can be challenging.

To efficiently discern a traffic pattern, unstructured traffic across sessions is clustered according to a distance metric that employs importance weights for placements in feature vectors of the multi-session unstructured traffic. The use of importance weights in the distance metric and the formula for the distance metric are conducive to generating high-quality clusters for feature vectors of network traffic and accurate patterns for traffic identification from the clusters. Prior to clustering, a natural language processor extracts features from unstructured traffic comprising tokens of consecutive valid ASCII characters. As traffic features for batches of sessions are processed by the natural language processor, a feature weighted distance engine calculates a matrix of pairwise distances between traffic features for all pairs of sessions within a batch using the importance weighted distance metric. A clustering model generates clusters of sessions using the matrix of pairwise distances and merges the resulting clusters with an existing clustering of previously analyzed sessions of unstructured traffic. Ongoing clustering of unstructured traffic allows the cybersecurity appliance to develop traffic signatures that identify a corresponding application for traffic of a session.

Example Illustrations

FIG. 1 is a schematic diagram of an example system for generating clusters of sessions of unstructured traffic via feature weighted session distances. A natural language processor 105 receives multi-session unstructured traffic 100, which in this illustration is TCP traffic for multiple sessions for which a corresponding application cannot be discerned based on evaluation of TCP packets. To illustrate, a cybersecurity appliance monitors network traffic at the TCP layer (e.g., evaluates packets being processed by a TCP network program). The cybersecurity appliance, which may host the TCP network program or be in communication with the TCP network program, evaluates the packets forming traffic of a session to determine whether a corresponding application can be identified. If not, then the cybersecurity appliance deems the traffic unstructured traffic. The parser 101 can remove or replace with null values ASCII characters from the unstructured TCP traffic in a range of ASCII characters known to not correspond to substantive content in the multi-session unstructured traffic 100. Common removed ASCII characters include brackets, quotation marks, backslashes, question marks, etc. The parser 101 communicates parsed traffic 102 to a tokenizer 103. The tokenizer 103 can isolate consecutive ASCII characters in the parsed traffic 102 bookmarked by ASCII characters that have been removed. The tokenizer 103 can additionally remove character sequences below a threshold character count (e.g., 3) and/or character sequences known to be non-substantive across previously analyzed unstructured traffic. The tokenizer 103 can store the resulting strings of ASCII characters (as previously isolated) in feature vectors 104 or can use an algorithm such as num2vec to convert the strings to numbers so that the feature vectors 104 comprise a numerical vector. Other algorithms, such as accessing a database of string/number pairs generated from previously seen ASCII strings, can be used to convert the feature vectors 104 to a numerical vector. The numerical conversion operation can alternatively be performed by a feature weighted distance engine 107. The natural language processor 105 collects the feature vectors 104 across batches of sessions of unstructured traffic before communicating them to the feature weighted distance engine 107. The natural language processor 105 further stores metadata corresponding to each session of unstructured traffic in feature vectors 104 such as metadata describing a device (e.g., device identifier), program, network, etc. that originated the traffic. This metadata is stored through the subsequent data pipeline and is used later in the workflow to identify existing clusters for sessions of unstructured TCP traffic.

An example session of unstructured TCP traffic 130 comprises the following ASCII characters:

198.51.100.0:8060 VIDE~ . . . ; >>")F)d:\video\EXT ATM\01.07.2021\18h41m34s.avi?Yg The parser 101 processes these ASCII characters into an example parsed TCP session 131:

198.51.100.0□8060 VIDE□>>□F□d: □video□EXT ATM□01.07.2021□18h41m34s.avi□Yg

In this example, the character sequences ':', '~ . . . , '")', ')', '\', '\', '\', '\', and '48' are replaced by null value characters. The tokenizer 103 then generates an example feature vector 132 as follows:

'198.51.100.0' '8060' 'VIDE' 'video' 'EXT ATM' '01.07.2021' '18h41m34s.avi'

The tokenizer 103 has removed the character sequences 'F', 'd:', and 'Yg' for containing too few characters and the remainder of the character sequences are TCP payload features.

The feature weighted distance engine 107 receives the feature vectors 104 and uses them to generate a pairwise session distance matrix 106. The pairwise session distance matrix 106 is generated using a distance function. The distance function compares feature vectors for each pair of sessions of unstructured traffic in the feature vectors 104 using a set of placement relative weights of each feature in the respective session. Domain-level knowledge used to ascertain importance of a feature based on placement within a feature vector will have been obtained based on observation of common attributes of sessions (e.g., custom network applications, vendor specific network protocols, device specific protocols, etc.). The common attributes are determined from information available at the corresponding data flow layer. To quantify ascertained importance, weights are set that represent placement-based importance. While embodiments may set weights for each position within a feature vector, some of those weights may be default weights assigned when a feature vector is instantiated. In some cases, a subset of feature vector entry positions are assigned weights. The weights can be trained using existing session data that has been previously identified and/or clustered or the weights can be determined by a domain-level expert. A domain-level expert can, for instance, determine that sessions of unstructured traffic frequently have internet protocol (IP) addresses in the first entry and can give the first entry a low weight for classifying or clustering traffic.

A clustering model 109 receives the pairwise session distance matrix 106. The clustering model 109 then applies a clustering algorithm to the pairwise session distance matrix 106. For instance, the clustering model 109 can use density-based spatial clustering of applications with noise (DBSCAN). Because DBSCAN only needs pairwise distances between feature vectors 104 as opposed to coordinates corresponding to each session in Euclidean space, DBSCAN can be applied directly to the pairwise session distance matrix 106. In other embodiments, the clustering model 109 can use an algorithm such as k-means clustering and can embed each of the feature vectors 104 in Euclidean space prior to clustering. While described with reference to specific clustering models including DBSCAN and k-means clustering, the clustering model 109 can be any unsupervised learning model that generates clusters of feature vectors. The clustering model 109 stores the resulting clusters and metadata for each session in the clusters in session clusters 114.

A cluster merger 111 receives the session clusters 114 from the clustering model 109 and uses corresponding metadata initially stored in the feature vectors 104 to generate a session query 108. The session query 108 can, for instance, indicate one or more devices or programs that originated unstructured traffic for sessions in the session clusters 114. The cluster merger 111 communicates the session query 108 to an unstructured traffic cluster database 110. The unstructured traffic cluster database 110 retrieves deployed session clusters 112 corresponding to the session query 108. The unstructured traffic cluster database 110 can be indexed by device identifiers or product identifiers. The deployed session clusters 112 correspond to clusters across multiple devices and multiple products indicated by the session query 108 to be merged with the session clusters 114. In some instances, when the unstructured traffic cluster database 110 does not have clusters corresponding to the session query 108, the unstructured traffic cluster database 110 returns a null value or empty cluster.

The cluster merger 111 receives the deployed session clusters 112 from the unstructured traffic cluster database 110 and merges them with the session clusters 114. In embodiments where the deployed session clusters 112 are null or empty, no merging operation is performed and resulting merged session clusters 116 comprises the session clusters 114. In embodiments where the deployed session clusters 112 are non-empty, the cluster merger 111 generates representative vectors corresponding to cluster centers for each of the clusters in the deployed session clusters 112 and the session clusters 114. The cluster merger 111 can, for instance, numerically average feature vectors in the feature vectors 104 (after using natural language processing to convert strings of ASCII characters to numbers) for each cluster to generate the representative vectors. The deployed session clusters 112 can have representative vectors and numerical feature vectors stored for each cluster. The representative vectors comprise representations for each cluster that can be generated, for instance, based on cluster centers or based on statistics of feature vectors (e.g., string frequency) within each cluster.

The cluster merger 111 can then determine clusters to merge using merging criteria. The merging criteria can be to merge clusters with representative vectors within a threshold distance in a space of representative vectors. Once merged, the cluster merger 111 can compute new representative vectors using corresponding session feature vectors for the merged clusters. Then, in an iterative process, the cluster merger 111 can again determine whether any of the new representative vectors satisfy the merging criteria. The iterative process can proceed until the resulting merged clusters stabilize at each iteration or until a threshold number of iterations has been performed. In some embodiments, a single merging operation is performed by the cluster merger 111. The cluster merger 111 stores the final merged clusters, representative vector, and feature vectors in merged session clusters 116.

The cluster merger 111 communicates the merged session clusters 116 to the unstructured traffic cluster database 110 and to a pattern identification engine 113. The pattern identification engine 113 uses feature vectors for each cluster in the merged session clusters 116 to generate patterns indicating common formats for feature vectors in each cluster. Each pattern is a feature vector having values at a subset of its' entries and null or zero values everywhere else. Each non-zero or nonnull value is determined based on a statistical analysis of the corresponding feature vectors. For instance, the pattern identification engine 113 can determine that an ASCII string has a frequency above a threshold frequency (e.g., 80%) for a specific entry across feature vectors and therefore is included in the pattern. Additionally or alternatively, the pattern identification engine 113 can determine that a short list (e.g., below threshold size 20) of ASCII strings has a frequency of occurrence at a particular entry above a threshold frequency across feature vectors. An example pattern 133 is the following:

"8060' 'VIDE' "EXT ATM' ' '' '

The example pattern 133 comprises entries of an empty string, '8060', 'VIDE', 'EXT ATM', an empty string, and an empty string. This pattern occurs in the example feature vector 132.

The pattern identification engine 113 communicates a pattern generated from the merged session clusters 116 to a cybersecurity appliance (not depicted). In the provided example, the cybersecurity appliance receives the features '8060', 'VIDE', "EXT ATM' along with the respective feature placements. The cybersecurity appliance can then implement the pattern in an inline malicious detector to detect each of these features in online unstructured traffic and to flag sessions of unstructured traffic having one or more of the features as malicious. In some embodiments, the cybersecurity appliance can only flag sessions of unstructured traffic that have a number of features above a threshold from the pattern. Patterns can comprise multiple representative vectors corresponding to multiple clusters. The cybersecurity appliance can detect features across representative vectors in the pattern and can also detect features having different feature placements than in the pattern but can give these features lower weight when determining whether to flag sessions of unstructured traffic as malicious.

Figure 2:
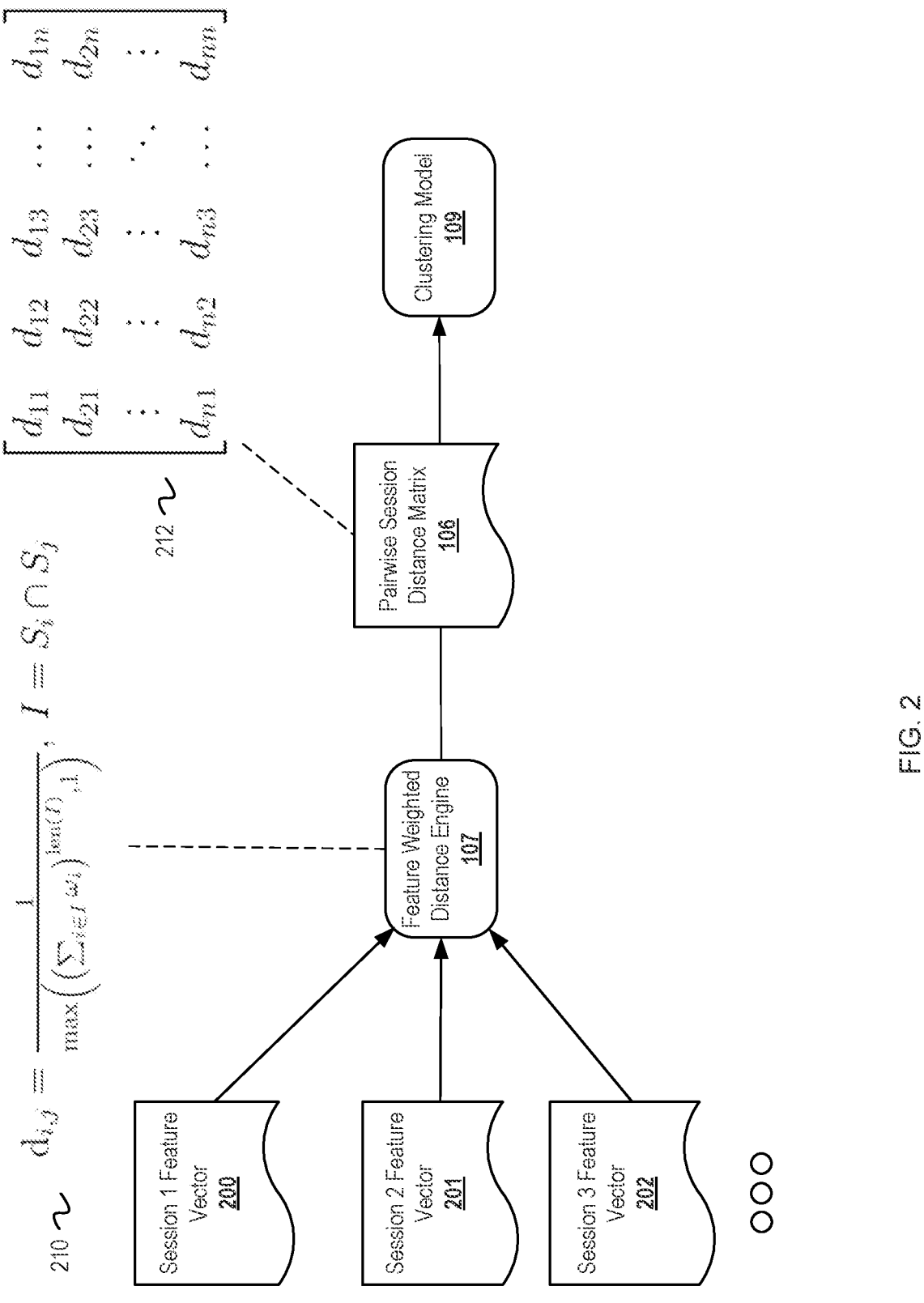
FIG. 2 is a schematic diagram of an example system for generating a distance matrix for feature vectors of sessions of unstructured traffic with a feature weighted distance function.

FIG. 2 is a schematic diagram of an example system for generating a distance matrix for feature vectors of sessions of unstructured traffic with a feature weighted distance function. The feature weighted distance engine 107 receives session 1 feature vector 200, session 2 feature vector 201, and session 3 feature vector 202 and computes pairwise distances between all of them to generate the pairwise TCP traffic session distance matrix 106. An example distance function 210 is given in equation (1):

$$d_{i,j} = \frac{1}{\max\left(\left(\sum_{k \in I} \omega_i\right)^{len(I)}, 1\right)}, I = S_i \cap S_j \tag{1}$$

Here, $\{\omega_i\}_i$ are weights, $S_i$ is the support of the ith feature vector having intersecting entries with the jth feature vector, and $S_j$ is the support of the jth feature vector having intersecting entries with the ith feature vector (i.e., I is the set of indices for entries that are equal in feature vectors i and j). The weights $\{\omega_i\}_i$ are determined based on importance of entries from previously seen unstructured traffic from the same sources using domain-level knowledge or a statistical analysis on previously classified unstructured traffic. When there are no intersecting entries then the sum is zero and the distance function gives a value of max(0,1)=1. As an increasing number of weights correspond to intersecting entries, the sum of the weights increases which in turn increases the denominator, thereby decreasing distance between feature vectors. The weights are normalized so that the sum is greater than 1 and can be further normalized so that every weight is greater than one so that feature vectors having any overlapping entries have distance less than 1. The distance function given by equation (1) is constructed for the purpose of clustering unstructured traffic and the use of importance weights as well as the choice of formula makes it effective for generating high-quality clusters that yield accurate patterns for traffic identification. As illustrated above, the distance function is smaller for feature vectors having intersecting features with higher importance. This choice leads to a more descriptive and accurate distance for the resulting clusters that reflects domain-level knowledge of unstructured traffic.

To exemplify, suppose that all feature vectors have length 3, $\omega_1=2$, $\omega_2=4$, and $\omega_3=8$, so that the first feature has lowest importance, the second feature has greater importance, and the third feature has highest importance. Note that the weights have sum 2+4+8=14>1. Two feature vectors only intersecting in the first feature have distance $$\frac{1}{\max(2,1)} = \frac{1}{2},$$

whereas two feature vectors intersecting in the third feature have distance $$\frac{1}{\max(8,1)} = \frac{1}{8}.$$

Feature vectors that intersect at higher importance entries thus have lower distance and are more likely to be in the same cluster.

An example distance matrix 212 has entries $d_{i,j}$ or i,j=1 to n, where n is the total number of feature vectors in the current batch of sessions of unstructured traffic. Although according to the above formula, the diagonal entries $d_{i,i}$ are non-zero, in some embodiments, the feature weighted distance engine 107 can by default set all diagonal entries to zero or can compute them explicitly as 1 over the sum of all weights $\{\omega_i\}_i$ (this computation can be performed once). The feature weighted distance engine 107 communicates the pairwise session distance matrix 106 to the clustering model 109.

Figure 3:
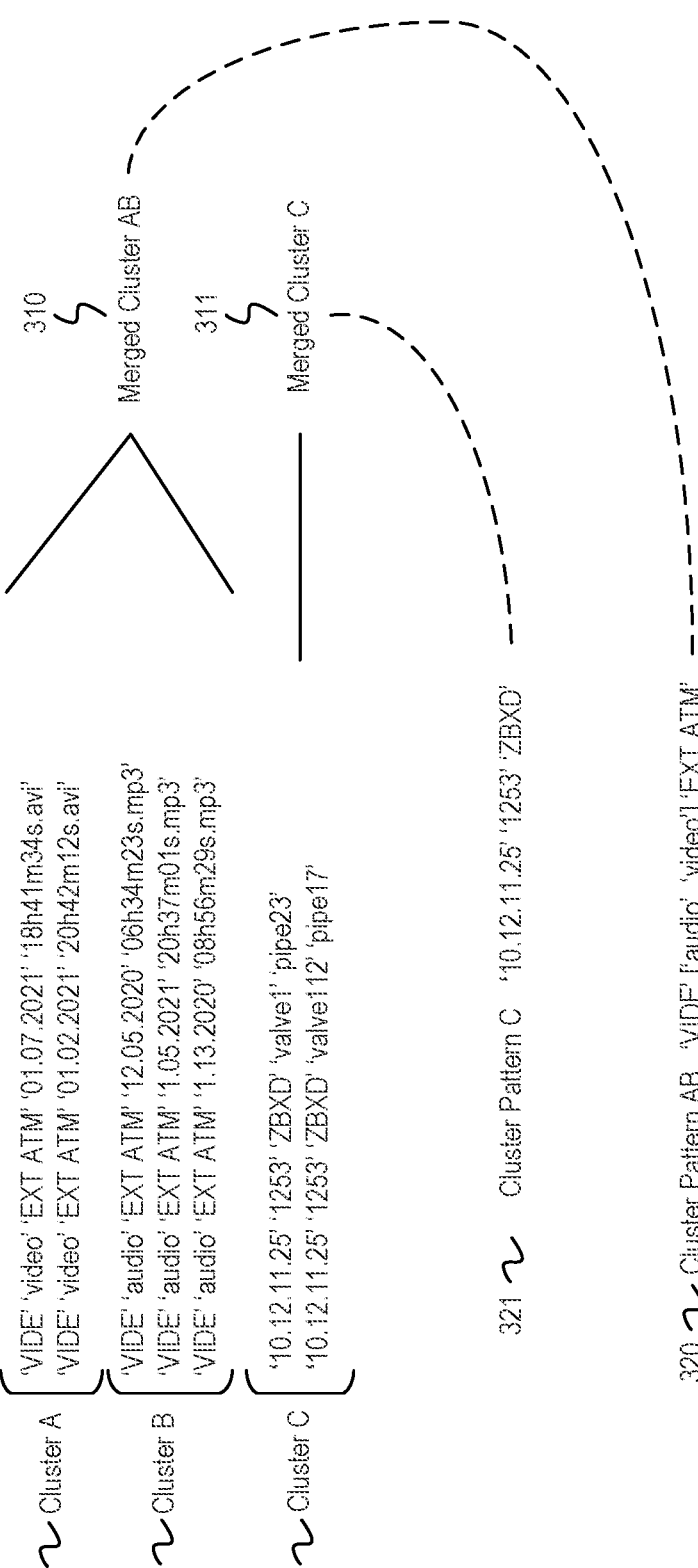
FIG. 3 is a schematic diagram of merging and pattern extraction for example clusters of feature vectors for sessions of unstructured traffic.

FIG. 3 is a schematic diagram of merging and pattern extraction for example clusters of feature vectors for sessions of unstructured traffic. Example cluster A 300 includes the following feature vectors:

'VIDE'    'video'    'EXT    ATM'    '01.07.2021'
   '18h41m34s.avi'
'VIDE'    'video'    'EXT    ATM'    '01.02.2021'
   '20h42m12s.avi'

Example Cluster B 301 Includes the Following Feature Vectors:

'VIDE'    'audio'    'EXT    ATM'    '12.05.2020'
   '06h34m23s.mp3'
'VIDE'    'audio'    'EXT    ATM'    '1.05.2021'
   '20h37m01s.mp3'

'VIDE'    'audio'    'EXT    ATM'    '1.13.2020'
   '08h56m29s.mp3'

Example Cluster C 303 Includes the Following Feature Vectors:

'10.12.11.25' '1253' 'ZBXD' 'valve1' 'pipe23'
'10.12.11.25' '1253' 'ZBXD' 'valve112' 'pipe17'

In this example, a cluster merger (not shown) merges cluster A 300 and cluster B 301, but does not merge cluster C 303. Empirically, cluster A 300 and cluster B 301 appear similar by having 100% frequency of 'VIDE' in the first entry and 'EXT ATM' in the third entry, as well as 100% frequency of 'video' or 'audio' in the second entry. Cluster C 301 has no feature overlap with either of cluster A 300 or cluster B 301. A pattern identification engine (also not shown) extracts cluster pattern AB 320 from merged cluster AB 310 comprising cluster A 300 and cluster B 301, and extracts cluster pattern C 321 from merged cluster C 311 comprising cluster C 303. Cluster pattern C 321 comprises the features '10.12.11.25', '1253', and 'ZBXD' which all have 100% frequency in merged cluster C 311. Cluster pattern AB 320 comprises features 'VIDE', ['audio', 'video'], and 'EXT ATM'. The first and third entry features have 100% frequency in merged cluster AB 310 and the list of features in the second entry has 100% frequency in merged cluster AB 310 with 'audio' having 60% frequency and 'video' having 40% frequency.

Cluster A 300 and cluster B 301 can be merged based on representative vectors for each cluster. For instance, a representative vector can comprise features above a threshold frequency (e.g., 90%) within each cluster. By this criterion, a representative vector for cluster A 300 can be ['VIDE', 'video', 'EXT ATM'] and a representative vector for cluster B 301 can be ['VIDE', 'audio', 'EXT ATM']. A comparison for these representative vectors can be a frequency of exact matches of features in the representative vectors. In this instance, the first feature and third feature, 'VIDE' and 'EXT ATM', are identical so the frequency of exact matches is about 66%. A merging criterion can be that the representative vectors for cluster A 300 and cluster B 301 have exact matches of features above a threshold frequency (e.g., 50% which would result in merging of cluster 300A and cluster B 301). Alternatively, comparing the representative vectors can comprise embedding the entries in a numerical space using natural language processing (e.g., Word2vec) and then computing a Euclidean distance between representative vectors. In this example, the first and third entries of the representative vectors once embedded in numerical space will have the same value, resulting in a low distance. A threshold merging distance below which clusters are merged can be determined based on previously seen clusters and distances between representative vectors for merged and non-merged clusters.

Alternative merging criteria that don't involve representative vectors can be implemented. A cluster merger can determine that a sufficient number of entries for specific feature placements have a feature or a short list of features above a threshold statistical frequency. The sufficient number of entries can be a specified fraction of the total number of entries (e.g., above one half) and "short" feature lists can be feature lists below a threshold length (e.g., 20 features). For instance, a cluster merger can determine that the feature list ['video', 'audio'] has 100% frequency in the second entry across cluster A 300 and cluster B 301, and that the features 'VIDE' and 'EXT ATM' have 100% frequency in the first and third entries, respectively, across cluster A 300 and cluster B 300. In this case, a 100% frequency of features or short feature lists occurs for 60% of feature entries.

A criterion can combine frequency of features or lists of features that are above the threshold frequency with the fraction of entries with features or features lists above the threshold frequency. For instance, the criterion can check the following formula:

$$\text{(fraction of entries above threshold frequency)} + \text{(average frequency of entries above threshold frequency)} > \tau,$$

where $\tau$ is a threshold value for satisfying the criterion. $\tau$ can be determined, for instance, by testing the merging criterion on previously seen sessions of unstructured traffic where the corresponding applications generating the sessions of traffic are known. In this example, feature vectors for the previously seen sessions of unstructured traffic are clustered and clusters that need to be merged are determined based on the clusters having traffic from the same application or a high percentage of traffic from the same application. $\tau$ is thus, for this example, computed as an optimal T value that maximizes the number of merged clusters that are supposed to be merged (based on known corresponding applications) while minimizing the number of clusters that are not supposed to be merged. This value can be computed empirically or can be determined based, for instance, on a convex optimization formulation of the min/max problem of simultaneously maximizing correct merges and minimizing incorrect merges. In the given example in FIG. 3, this formula gives $\frac{3}{5}+1=1.6$, which satisfies the criterion for $\tau<1.6$. Combinations of merging criteria for numerical representative vectors and frequency-based merging criteria can be used (e.g., that at least one or all of multiple criteria are satisfied).

The embodiments provided herein relate to clustering feature vectors of sessions of unstructured traffic for the purposes of pattern identification and filtering for clusters of sessions of malicious traffic corresponding to malicious applications. However, any of the embodiments can easily be extended to clustering and generating patterns for unstructured traffic originating from any source that needs to be identified. Firewalls or cybersecurity appliances implementing these clustering and pattern identification techniques can, without additional technical requirements, also filter and identify patterns for benign traffic simply by including additional clusters in filters. To exemplify, a cybersecurity appliance can have a list of approved applications that are safe for traffic received by the cybersecurity appliance. The cybersecurity appliance can filter any traffic not corresponding to an application in the list of approved applications ("unauthorized applications") regardless of whether it is malicious or benign (i.e., traffic that does not fit any of the patterns for applications in the list of approved applications).

One possible implementation of application identification for unstructured traffic is a zero-trust security policy. A zero-trust security policy analyzes traffic using several criteria such as the identity of a source of traffic, an application that the traffic is attempting to access, a time at which the traffic is attempting to access the application, a destination resource for the traffic, a reason for the traffic to access the application, and a method by which the traffic is accessing the application. To exemplify, a user in sales can attempt to access a salesforce application during working hours through a resource in the United States via a salesforce website for business purposes. The policy can weigh all of these factors when making a determination that this traffic is allowable due to corresponding to typical and/or benign behavior for a user accessing this application. The present disclosure enables identification of the application that a user is attempting to access, even when the user-originated traffic is unstructured, which helps guide the zero-trust security policy when it otherwise may not be able to determine what application a user is attempting to access.

Figure 4:
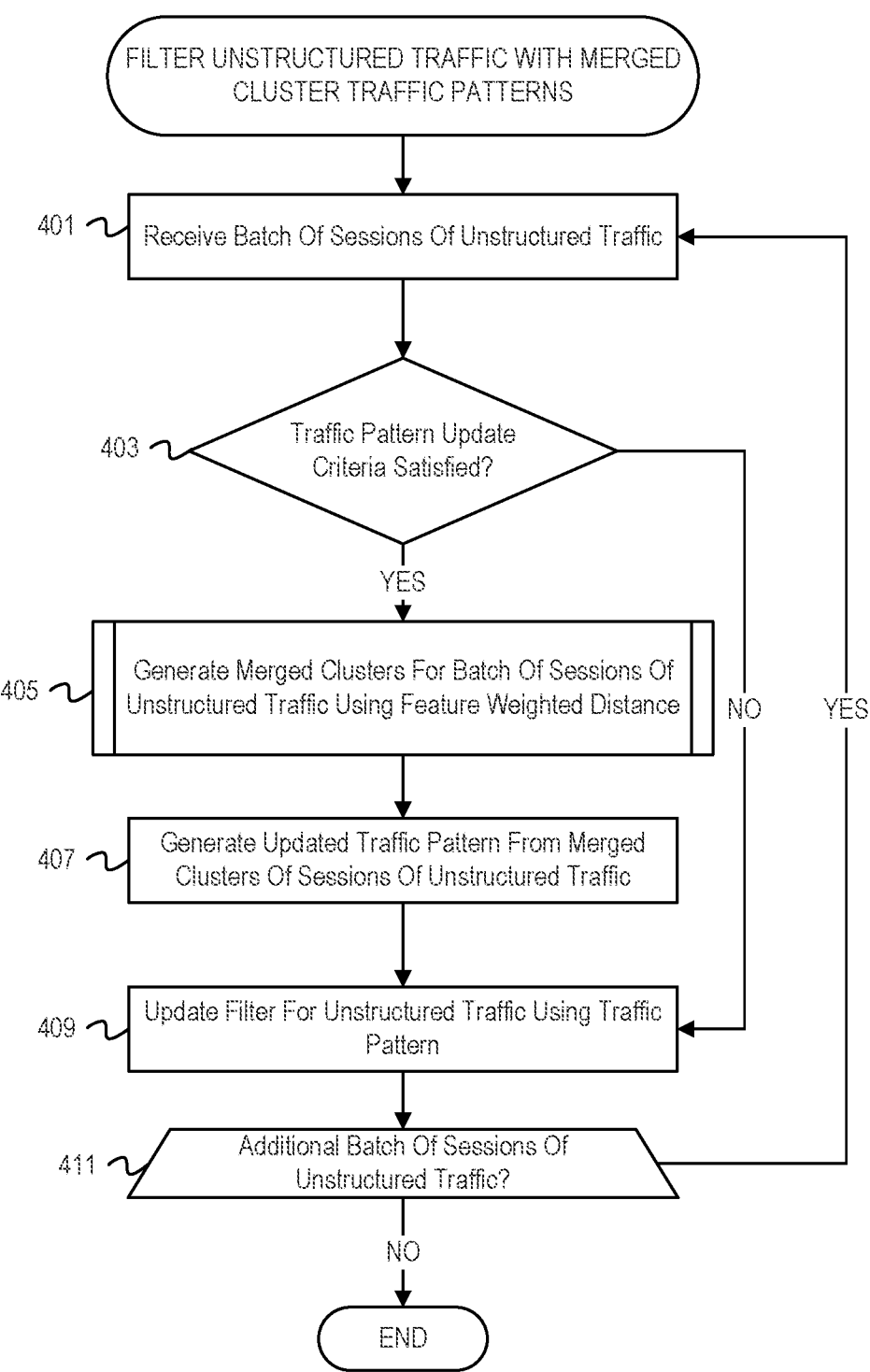
FIG. 4 is a flowchart of example operations for filtering unstructured traffic with merged cluster traffic patterns.
Figure 5:
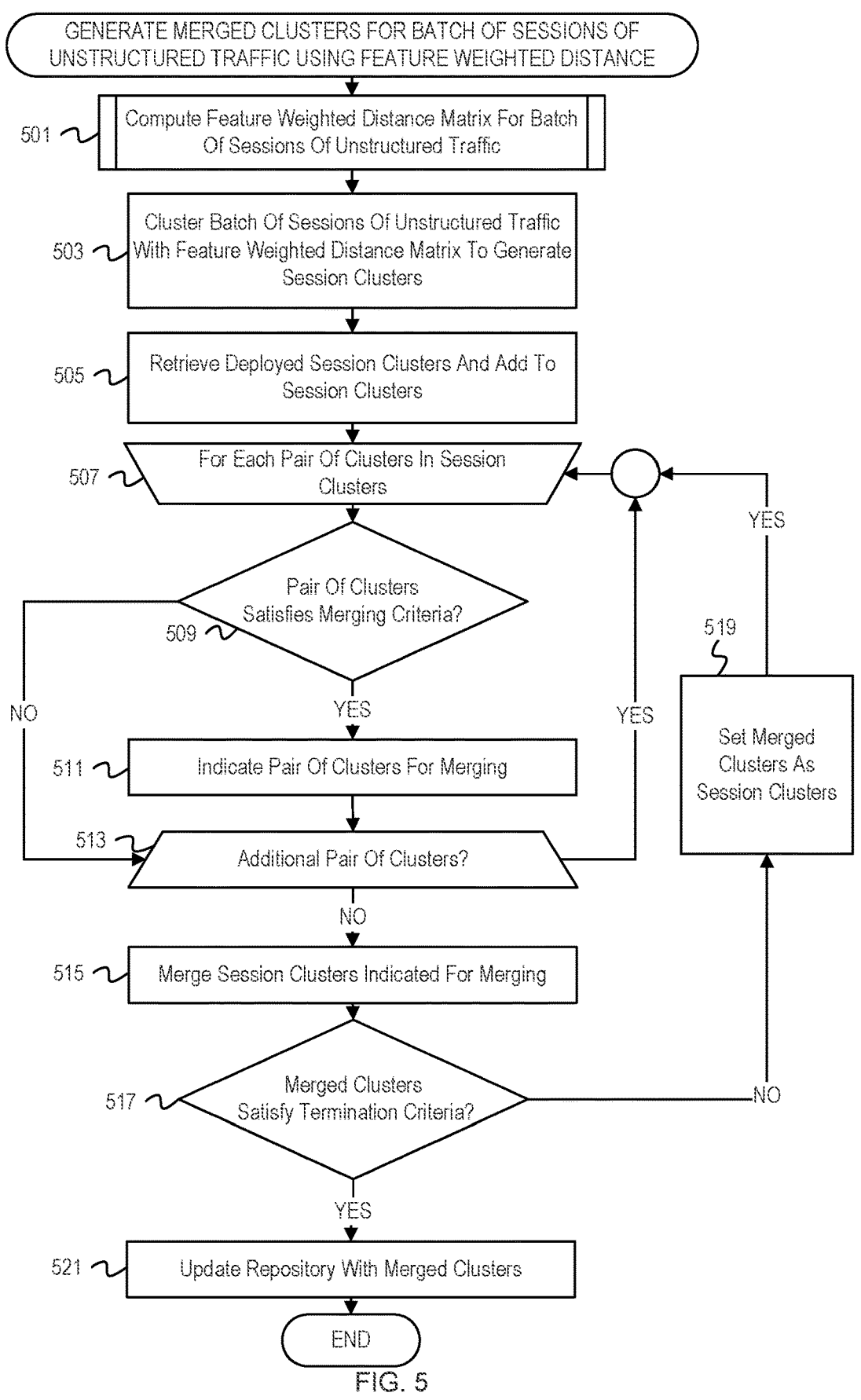
FIG. 5 is a flowchart of example operations for generating merged clusters for a batch of sessions of unstructured traffic using feature weighted distance.

FIGS. 4-6 are flowcharts of example operations corresponding to the preceding examples, but in more general terms. The example operations are described with reference to a cybersecurity appliance for consistency with the earlier figure(s). The names chosen for program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 4 is a flowchart of example operations for filtering unstructured with merged cluster traffic patterns. At block 401, a cybersecurity appliance receives a batch of sessions of unstructured traffic. For instance, the cybersecurity appliance determines that a corresponding application (e.g., application authorized by a security policy) cannot be identified based on evaluating the protocol data units that form the session traffic. Based on determining that the traffic is unstructured, the cybersecurity appliance proceeds with feature extraction and clustering analysis. The size of each batch of sessions of unstructured traffic can depend on characteristics of one or more endpoints that communicate the traffic, volume of traffic sessions, intervals of collection for traffic sessions, etc. The cybersecurity appliance can implement an inline traffic pattern detector that detects malicious unstructured traffic with low latency (e.g., 10 milliseconds) as traffic is received. The updating of traffic patterns with cluster merging of sessions of unstructured traffic can occur in a separate pipeline to inline malicious detection, and the cybersecurity appliance can store copies of unstructured traffic in memory to be used for pattern/cluster updates.

At block 403, the cybersecurity appliance determines whether traffic pattern update criteria are satisfied. The traffic pattern update criteria can be each time a batch of sessions of unstructured traffic is received by the cybersecurity appliance, according to a periodic update schedule (e.g., every week), based on user-specified update triggers, etc. If the traffic pattern update criteria are satisfied, operations proceed to block 405. Otherwise, operations skip to block 409.

At block 405, a cybersecurity appliance generate merged clusters for the batch of sessions of unstructured traffic using feature weighted distance. Each merged cluster comprises clusters of feature vectors for sessions of unstructured traffic in the batch of sessions of unstructured traffic and sessions of unstructured traffic previously analyzed by the cybersecurity appliance. The operations to generate merged clusters are described with greater detail in FIG. 5.

At block 407, the cybersecurity appliance generates an updated traffic pattern from merged clusters of sessions of unstructured traffic. The cybersecurity appliance can use representative vectors in clusters from the merged clusters to generate the patterns. The representative vectors are feature vectors that correspond to cluster centers and/or cluster statistics for the respective clusters. The cybersecurity appliance engine can identify common features in representative vectors for malicious clusters to generate patterns. For instance, the cybersecurity appliance can choose features for feature placements that have sufficiently high frequency in the respective feature placements for representative vectors of malicious clusters. Multiple patterns can be generated for using the representative vectors. For instance, malicious clusters can be grouped by IP addresses that originated the corresponding sessions of unstructured traffic, and representative vectors for malicious clusters from similar IP addresses can be used to generate separate patterns.

At block 409, the cybersecurity appliance updates a filter for unstructured traffic using the traffic pattern. The cybersecurity appliance can run the filter for the traffic session on an inline malicious detector with low overhead for efficient, low latency detection of malicious unstructured traffic. For instance, the operation of checking each feature for an incoming session of unstructured traffic against feature vectors in the pattern can be performed quickly, and a session of unstructured traffic can be flagged as malicious once a sufficient number of features from the pattern occur.

At block 411, the cybersecurity appliance determines whether there is an additional batch of sessions of unstructured traffic. When the cybersecurity appliance receives an additional batch of sessions of unstructured traffic, flow returns to block 403. Otherwise, the operations in FIG. 4 are complete until the cybersecurity appliance is reactivated or receives an additional batch of sessions of unstructured traffic.

FIG. 5 is a flowchart of example operations for generating merged clusters for a batch of sessions of unstructured traffic using feature weighted distance. At block 501, a cybersecurity appliance computes a feature weighted distance matrix for the batch of sessions of unstructured traffic that was received by the cybersecurity appliance (401). The operations at block 501 are described in greater detail with respect to FIG. 6.

At block 503, the cybersecurity appliance clusters the batch of sessions of unstructured traffic with the feature weighted distance matrix to generate session clusters. The cybersecurity appliance can cluster the batch of sessions of unstructured traffic using any clustering algorithm that can cluster based on pairwise distances with the feature weighted distance matrix. Alternatively, the cybersecurity appliance can first embed the feature vectors into Euclidean space such that the pairwise distances are approximately the distances in the feature weighted distance matrix and can subsequently cluster the feature vectors in Euclidean space. An example clustering algorithm is DBSCAN, which uses pairwise distances to perform a density-based clustering of the sessions of unstructured traffic. The resulting clusters are stored as the session clusters. The cybersecurity appliance also stores cluster centers and/or representative vectors corresponding to cluster centers within each cluster. The cluster centers can be computed by the clustering algorithm during clustering (e.g., k-means clustering). Representative vectors can be generated by averaging feature vectors within each cluster or choosing features for each feature placement with highest statistical frequency. Entries of representative vectors where there is no feature with highest statistical frequency for the corresponding feature placement can be left as empty or null features.

At block 505, the cybersecurity appliance retrieves deployed session clusters from a database of unstructured traffic session clusters and adds them to the session clusters. The deployed session clusters are generated from sessions of unstructured traffic previously analyzed by the cybersecurity appliance. In some instances, the deployed session clusters are generated by a different method than the merging of clusters herein and need to be updated via cluster merging.

At block 507, the cybersecurity appliance begins iterating through pairs of clusters in the session clusters to merge clusters according to a merging criterion. The example operations at each iteration occur at blocks 509 and 511.

At block 509, the cybersecurity appliance determines whether the current pair of clusters satisfies merging criteria. The cybersecurity appliance can, when the representative vectors of each cluster are numerical, determine whether the pair of representative vectors has a numerical distance less than a threshold distance to satisfy the merging criteria. In embodiments where the representative vectors are string vectors, the cybersecurity appliance can determine whether the number of intersecting features between the pair of representative vectors is above a threshold to determine that the pair of clusters satisfies the merging criteria. Alternatively, the cybersecurity appliance can embed the string representative vectors in Euclidean space using a natural language processor and can compute a numerical distance between the embedded vectors as above. If the merging criteria are satisfied, flow proceeds to block 511. Otherwise, flow skips to block 513.

At block 511, the cybersecurity appliance indicates the pair of clusters for merging. The cybersecurity appliance can store a pair of identifiers (e.g., "(1,4)") for each of the pair of clusters in memory. The pairs of identifiers can be stored as an ordered list to guide which order to subsequently merge cluster pairs.

At block 513, the cybersecurity appliance determines whether there is an additional pair of clusters in the session clusters. If an additional pair of clusters is present, flow returns to block 507. Otherwise, flow proceeds to block 515.

At block 515, the cybersecurity appliance merges session clusters indicated for merging. The cybersecurity appliance can iterate through an ordered list of identifiers for cluster pairs. At each iteration, the cybersecurity appliance can update an identifier for the pair of clusters to include both identifiers of previous clusters. As clusters are merged, it is possible that a cluster will be indicated for merging with a cluster that has already been merged. Because, in this example, cluster identifiers are combined during merging, the cybersecurity appliance can search for the cluster identifier within a list of cluster identifiers for merged clusters when determining which clusters to merge. Subsequent to all merging iterations, the cluster merging can update identifiers so that merged clusters have a single unique identifier and can update cluster assignment of feature vectors for sessions of unstructured traffic within the clusters that have been merged.

At block 517, the cybersecurity appliance determines whether the merged clusters satisfy a set of one or more cluster merging termination criteria. For instance, the cybersecurity appliance can determine whether any additional clusters have been merged since the previous merging iteration (e.g., as indicated in the previous example by clusters having multiple identifiers post merging). An additional criterion can be that less than a threshold number of merging iterations have occurred. If the cluster merging termination criteria is not satisfied, flow proceeds to block 519. Otherwise, the flow proceeds to block 521.

At block 519, the cybersecurity appliance sets the merged session clusters as the session clusters. Flow then proceeds to block 507 to perform additional merging iterations on the session clusters until the cluster merging termination criteria are satisfied.

At block 521, the cybersecurity appliance updates a repository with the merged clusters. The cybersecurity appliance can replace previously stored clusters for the same sources of unstructured traffic with the merged clusters (e.g., the deployed clusters). Clusters can be indexed by scope of corresponding traffic in the repository and the updates can be according to the indexed scope. Clusters in the merged clusters can be labelled with identifiers indicating scope and/or sources for corresponding traffic.

FIG. 6 is a flowchart of example operations for computing a feature weighted distance matrix for a batch of sessions of unstructured traffic. At block 601, a cybersecurity appliance determines feature weights using previously analyzed unstructured traffic. The feature weights are hard-coded values in the feature weighted distance engine and can be determined prior to implementation (i.e., prior to the operations in FIG. 6). The feature weights can be dynamically updated using a statistical analysis of incoming unstructured traffic. Feature weights can be determined, for instance, by identifying malicious traffic in sessions of unstructured traffic and identifying statistically common features in the malicious traffic. The cybersecurity appliance can then determine feature placements having statistically common features in the malicious traffic and can assign these feature placements higher feature weights accordingly. To exemplify, the cybersecurity appliance can determine that in 90% of maliciously detected sessions of unstructured traffic, the third feature is "EXT ATM" and can assign a feature weight of 90 to the third feature placement and that in 30% of malicious detected sessions of unstructured traffic, the second feature is "audio" and can assign a weight of 30 to the second feature placement. In some instances, the cybersecurity appliance can determine that a short list (e.g., less than 10) of features has a statistical frequency that influences (i.e., increases) feature weight of the respective feature placement. The cybersecurity appliance can employ domain-level knowledge of sessions of unstructured traffic when assigning feature weights (e.g., that the second feature is always an IP address which is known to be important for malicious detection).

At block 603, the cybersecurity appliance begins iterating through sessions in a batch of sessions of unstructured traffic received by the cybersecurity appliance (401). The example operation at each iteration occurs at block 605.

At block 605, the cybersecurity appliance parses and tokenizes the current session to generate a feature vector. The cybersecurity appliance can remove ASCII characters from the current session outside a set of allowable ASCII characters and can remove strings of consecutive allowable ASCII characters below a threshold feature length (e.g., 3 characters). The cybersecurity appliance can then apply an algorithm such as Word2vec to convert the strings of consecutive allowable ASCII characters into a numerical feature vector.

At block 607, the cybersecurity appliance determines whether there is an additional session in the batch of sessions of unstructured traffic. If an additional session is present, flow returns to block 603. Otherwise, flow proceeds to block 609.

At block 609, the cybersecurity appliance begins iterating through pairs of feature vectors for sessions in the batch of sessions of unstructured traffic. The cybersecurity appliance can, in some embodiments, skip self-pairs of sessions and can automatically assign a distance of 0 to distances between sessions and themselves in the distance matrix. The example operation at each iteration occurs at block 611.

At block 611, the cybersecurity appliance computes distance between the current pair of feature vectors with a distance function using the feature weights and stores the distance in the distance matrix. For instance, the cybersecurity appliance can use the distance given in equation (1). The cybersecurity appliance can use other distance equations that assign distances according to the feature weights (i.e., feature vectors with close or identical features in feature placements with high feature weights will have lower distance). The cybersecurity appliance stores the computed distance at the corresponding entry in the distance matrix. The sessions of unstructured traffic have an ordering and the computed distance is stored as the i,jth entry in the distance matrix where i is the index in the ordering for the first feature vector in the current pair and j is the index in the ordering for the second feature vector in the current pair. The ordering is arbitrary and can be chosen randomly or according to when the sessions of unstructured traffic were received by the cybersecurity appliance.

At block 613, the cybersecurity appliance determines whether there is an additional pair of feature vectors for features vectors of the batch of sessions of unstructured traffic. If an additional pair of feature vectors is present, flow returns to block 609. Otherwise, the operations in FIG. 6 are complete.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, embodiments may perform blocks 405, 407, and 409 without performing the operations in other blocks. Embodiments may perform only blocks 501, 503, and 519 in FIG. 5, and embodiments may only perform blocks 601, 605, and 611 without operations in the other depicted blocks. Embodiments may perform operations in FIG. 6 for any sessions of unstructured traffic regardless of grouping of batches. In some embodiments, features can be extracted from sessions of unstructured traffic according to any known methodologies for feature extraction and feature weights determined at block 601 can be determined prior to the operations in FIG. 6. Any of the operations depicted in FIGS. 4-6 can be performed, in some embodiments, for any network traffic not necessarily restricted to unstructured traffic. Any operations depicting batching and/or collection of traffic can be performed, in some embodiments, by a separate component or program to those depicted in FIGS. 4-6. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semi-conductor technology to store program code. More specific examples (a non-exhaustive list) of the machine-readable storage medium would include the following: a portable computer diskette, a hard disk, a random-access memory (RAM), a read-only memory (ROM), an erasable program-mable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propa-gated data signal with machine-readable program code embodied therein, for example, in baseband or as part of a carrier wave. Such a propagated signal may take any of a variety of forms, including, but not limited to, electro-magnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, includ-ing but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 7:
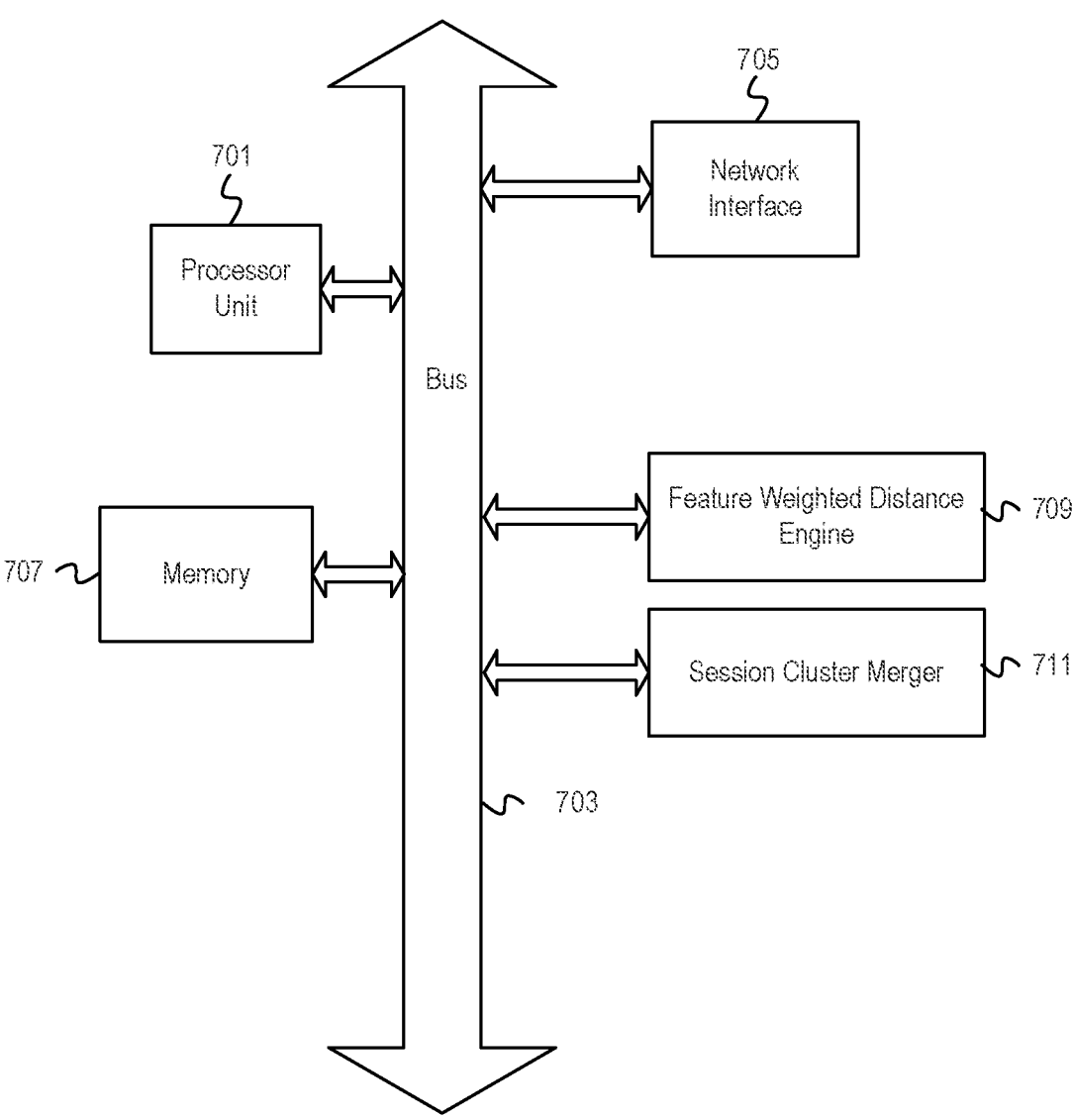
FIG. 7 depicts an example computer system with a feature weighted distance engine and a session cluster merger.

FIG. 7 depicts an example computer system with a feature weighted distance engine and a session cluster merger. The computer system includes a processor 701 (possibly includ-ing multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus 703 and a network interface 705. The system also includes a feature weighted distance engine 709 and session cluster merger 711. The feature weighted distance engine 709 can determine pair-wise distances between feature vectors for sessions of unstructured traffic generated by a natural language proces-sor using a feature weighted distance function and can stored the distances in a distance matrix. The session cluster merger 711 can iteratively merge clusters generated from the dis-tance matrix along with deployed clusters of sessions of unstructured traffic and can send the merged clusters to a pattern identification engine to generate patterns for mali-cious detection of unstructured traffic, as described variously above. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, addi-tional network interfaces, peripheral devices, etc.). The processor unit 701 and the network interface 705 are coupled to the bus 703. Although illustrated as being coupled to the bus 703, the memory 707 may be coupled to the processor 701.

While the aspects of the disclosure are described with reference to various implementations and exploitations, it will be understood that these aspects are illustrative and that the scope of the claims is not limited to them. In general, techniques for generating feature vectors for sessions of unstructured traffic, clustering the feature vectors using a feature weighted distance function, and merging the clusters to generate patterns for malicious traffic detection as described herein may be implemented with facilities con-sistent with any hardware system or hardware systems. Many variations, modifications, additions, and improve-ments are possible.

Plural instances may be provided for components, opera-tions or structures described herein as a single instance. Finally, boundaries between various components, operations and data stores are somewhat arbitrary, and particular opera-tions are illustrated in the context of specific illustrative configurations. Other allocations of functionality are envi-sioned and may fall within the scope of the disclosure. In general, structures and functionality presented as separate components in the example configurations may be imple-mented as a combined structure or component. Similarly, structures and functionality presented as a single component may be implemented as separate components. These and other variations, modifications, additions, and improve-ments may fall within the scope of the disclosure.

The invention claimed is:

1. A computer-implemented method comprising:

for each pair of sessions comprising a first session and a second session in a first plurality of sessions in network traffic, computing a distance between a first feature vector of the network traffic of the first session and a second feature vector of the network traffic of the second session, wherein computing the distance is based, at least in part, on weights of intersecting entries between the first feature vector and the second feature vector, wherein each weight of the weights represents importance of placement of a corresponding entry within feature vectors;

based on the computed distances, clustering the first plurality of sessions into a first plurality of session clusters;

updating a repository of session clusters based, at least in part, on the first plurality of session clusters;

identifying one or more patterns in session clusters result-ing from updating the repository of session clusters based, at least in part, on statistical frequencies of feature entries in the resulting session clusters, wherein identifying the one or more patterns comprises identi-fying feature entries in feature vectors for sessions based, at least in part, on statistical frequency of feature entries having a same placement among feature entries in feature vectors for the resulting session clusters exceeding a threshold frequency; and detecting malicious traffic based, at least in part, on the one or more patterns.

2. The method of claim 1, further comprising a cyberse-curity appliance determining that the network traffic is unstructured traffic, wherein computing the distances is based on the determination that the network traffic is unstructured traffic.

3. The method of claim 2, wherein determining that the network traffic is unstructured traffic comprises the cybersecurity appliance determining that a corresponding application cannot be identified based on protocol data units of the network traffic at the data flow layer.

4. The method of claim 1, further comprising applying a merging criterion to the first plurality of session clusters, wherein updating the repository of session clusters comprises updating the repository of session clusters with clusters resulting from applying the merging criterion.

5. The method of claim 4, further comprising obtaining clusters previously generated for a second plurality of sessions, wherein applying the merging criterion to the first plurality of session clusters comprises applying the merging criterion to the first plurality of session clusters and the obtained clusters.

6. The method of claim 4, wherein applying the merging criterion comprises merging clusters according to a comparison of representative vectors for the first plurality of session clusters.

7. The method of claim 6, wherein the comparison is based on frequency of exact matches for feature entries in the representative vectors.

8. The method of claim 1, further comprising extracting feature entries from the network traffic for each session in the first plurality of sessions with natural language processing and populating a feature vector for each session with the extracted feature entries, wherein placement of the feature entries in the feature vector is according to an ordering in which the extracted feature entries occurred in each session.

9. The method of claim 1, further comprising generating the weights based, at least in part, on statistical frequency of feature entries having a same placement in feature vectors for session clusters of a third plurality of sessions.

10. The method of claim 1, wherein clustering the first plurality of sessions into the first plurality of session clusters comprises density-based spatial clustering of applications with noise (DBSCAN) on the computed distances for the pairs of sessions in the first plurality of sessions.

11. The method of claim 1, wherein clustering the first plurality of sessions into the first plurality of session clusters comprises, embedding feature vectors for the first plurality of sessions in Euclidean space such that pairwise distances between embedded feature vectors in Euclidean space are approximately the computed distances between corresponding sessions in the first plurality of sessions; and clustering the embedded feature vectors in Euclidean space.

12. The method of claim 1, wherein computing the distances for the pairs of sessions in the first plurality of sessions comprises, for an ith feature vector corresponding to an ith session in the first plurality of sessions and a jth feature vector corresponding to a jth session in the first plurality of sessions, computing the distance between the ith and jth feature vector according to $$d_{i,j} = \frac{1}{\max\left(\left(\sum_{k \in I} \omega_i\right)^{len(I)}, 1\right)}, I = S_i \cap S_j,$$

wherein $d_{i,j}$ is the distance between the ith and the jth feature vectors;

wherein $\{\omega_i\}_i$ are weights for placements in the ith and jth feature vectors;

wherein len(I) is the number of elements in the set I; and wherein $I = S_i \cap S_j$ is the intersection of $S_i$, the set of indices of the support of the ith feature vector, and $S_j$, the set of indices of the support of the jth feature vector.

13. A non-transitory machine-readable medium having program code stored thereon that is executable by a computing device, the program code comprising instructions to:

extract feature entries from payloads of data flow layer packets of multiple sessions;

generate feature vectors for each of the multiple sessions from the extracted feature entries;

compute distances between pairs of feature vectors in the feature vectors based, at least in part, on weights of intersecting entries, wherein each weight of the weights for an entry quantifies importance of feature placement of the entry within a feature vector;

cluster the feature vectors based, at least in part, on the distances; and for each cluster of at least a subset of the clustered feature vectors, identify a pattern based, at least in part, on statistical frequencies of entries of the feature vectors of the cluster, wherein the instructions to identify the pattern comprise instructions to identify feature entries in feature vectors of the cluster based, at least in part, on statistical frequency of feature entries having a same placement among feature entries in feature vectors of the cluster exceeding a threshold frequency; and detect malicious traffic based, at least in part, on the pattern for each cluster.

14. The machine-readable medium of claim 13, further comprising program code to filter, from network traffic, sessions having feature entries with the identified patterns.

15. The machine-readable medium of claim 13, wherein the instructions to compute the distances between the feature vectors comprise instructions to compute pairwise distances for each pair of the feature vectors according to, for an ith and a jth feature vector in the feature vectors $$d_{i,j} = \frac{1}{\max\left(\left(\sum_{k \in I} \omega_i\right)^{len(I)}, 1\right)}, I = S_i \cap S_j;$$

wherein $d_{i,j}$ is the distance between the ith and the jth feature vectors;

wherein $\{\omega_i\}_i$ are weights for placements in the ith and jth feature vectors;

wherein len(I) is the number of elements in the set I; and wherein $I = S_i \cap S_j$ is the intersection of $S_i$, the set of indices of the support of the ith feature vector, and $S_j$, the set of indices of the support of the jth feature vector.

16. The machine-readable medium of claim 13, wherein the instructions to extract the feature entries comprise instructions to extract the feature entries with natural language processing, and wherein the instructions to generate the feature vectors comprise instructions to generate the feature vectors with placement of the feature entries in the feature vector according to an ordering in which the extracted feature entries occurred in each session.

17. An apparatus comprising:

a processor; and a computer-readable medium having instructions stored thereon that are executable by the processor to cause the apparatus to, extract feature entries from payloads of data flow layer packets of multiple sessions;

generate feature vectors for each of the multiple sessions from the extracted feature entries;

compute distances between pairs of feature vectors in the feature vectors based, at least in part, on weights of intersecting entries, wherein each weight of the weights for an entry quantifies importance of feature placement of the entry within a feature vector;

cluster the feature vectors based, at least in part, on the distances;

for each cluster of at least a subset of the clustered feature vectors, identify a pattern based, at least in part, on statistical frequencies of entries of the feature vectors of the cluster, wherein the instructions to identify the pattern comprise instructions executable by the processor to cause the apparatus to identify feature entries in the feature vectors of the cluster based, at least in part, on statistical frequency of feature entries having a same placement among feature entries in the feature vectors of the cluster exceeding a threshold frequency; and detect malicious traffic based, at least in part, on the pattern for each cluster.

18. The apparatus of claim 17, further comprising instructions executable by the processor to cause the apparatus to filter, from network traffic, sessions having feature entries with the identified patterns.

19. The apparatus of claim 17, wherein the instructions to compute the distances between the feature vectors comprise instructions executable by the processor to cause the apparatus to compute pairwise distances for each pair of the feature vectors according to, for an ith and a jth feature vector in the feature vectors, $d_{i,j}=1/\max((\Sigma_{i\in I}\omega_i)^{len(I)},1)$, $I=S_i\cap S_j$;

wherein $d_{i,j}$ is the distance between the ith and the jth feature vectors;

wherein $\{\omega_i\}_i$ are weights for placements in the ith and jth feature vectors;

wherein len(I) is the number of elements in the set I; and wherein $I=S_i\cap S_j$ is the intersection of $S_i$, the set of indices of the support of the ith feature vector, and $S_j$, the set of indices of the support of the jth feature vector.

20. The apparatus of claim 17, wherein the instructions to cluster the feature vectors based, at least in part, on the distances comprise instructions executable by the processor to cause the apparatus to cluster the feature vectors with density-based spatial clustering of applications with noise (DBSCAN) based on the distances.

* * * * *